United States Patent [19]

Smyres et al.

[11] 3,981,962

[45] Sept. 21, 1976

[54] DECOMPOSITION LEACH OF SULFIDE ORES WITH CHLORINE AND OXYGEN

[75] Inventors: Gary A. Smyres, Sparks; Philip R. Haskett, Reno; Bernard J. Scheiner, Sparks; Roald E. Lindstrom, Reno, all of Nev.

[73] Assignee: The United States of America as represented by the Secretary of the Interior, Washington, D.C.

[22] Filed: June 30, 1975

[21] Appl. No.: 591,743

[52] U.S. Cl. .................................. 423/35; 423/36; 423/39; 423/40; 423/87; 423/94; 423/95; 423/109; 423/141; 423/150; 423/568; 75/112
[51] Int. Cl.² .................... C01G 3/04; C01G 9/04; C01G 51/08; C01G 11/00
[58] Field of Search .................. 423/27, 38, 39, 40, 423/46, 36, 87, 92, 93, 98, 140, 150, 109, 35; 75/112, 114

[56] References Cited
UNITED STATES PATENTS

| 350,669 | 10/1886 | Endlich et al. | 423/40 |
|---|---|---|---|
| 415,060 | 11/1889 | Pollok | 423/40 |
| 1,908,994 | 5/1933 | Meyer | 423/46 |
| 1,971,573 | 8/1934 | Mitchell | 423/39 X |

OTHER PUBLICATIONS

U.S. Bureau of Mines, R.I. 7801 pp. 5–10, (1973).

*Primary Examiner*—Oscar R. Vertiz
*Assistant Examiner*—Brian E. Hearn
*Attorney, Agent, or Firm*—William S. Brown; Donald R. Fraser

[57] ABSTRACT

Complex sulfide ores or concentrates are decomposed by treatment with a combination of chlorine and oxygen, the amount of chlorine being limited to that necessary to convert sulfides of the desired metals, such as zinc, lead, copper, cadmium, silver, nickel and cobalt to chlorides.

7 Claims, No Drawings

DECOMPOSITION LEACH OF SULFIDE ORES WITH CHLORINE AND OXYGEN

Lead, zinc, copper, and silver are conventionally recovered from complex sulfide ores by various processing sequences based on gravity or flotation concentration, followed by subsequent roasting-leaching-electrowinning, or smelting treatment to produce metal. During the roasting and smelting operations, the sulfide content of the concentrate is converted to sulfur dioxide which is usually vented to the atmosphere, thus presenting a pollution problem. Conventional processing techniques also suffer from the following disadvantages: (1) The difficulty of adapting the smelter to obtain a high recovery of more than one metal from a complex ore; (2) the potential health hazards from lead and zinc fumes generated during pyrometallurgical treatment; (3) the high capital investment required to build a smelter for complex ores. This high capital cost often makes the mining of smaller deposits of sulfide ores unprofitable because of shipping and smelter charges.

Hydrometallurgical techniques have been coupled with roasting for treating zinc concentrates. Roasting the concentrate produces a calcine and $SO_2$. The calcine is leached with dilute sulfuric acid to solubilize the zinc as zinc sulfate. The leach solution is purified by zinc dust addition, and zinc is recovered from the purified solution by electrowinning. This process also has disadvantages. For example, zinc extraction is often in the 88 to 90 percent range because part of the zinc is converted to zinc ferrite during roasting which is insoluble in dilute acid. To recover the zinc from the ferrite, the calcium must be releached with stronger sulfuric acid solution which causes difficult problems with solution purification since, for electrowinning, the iron content of the solution must be essentially zero. Furthermore, the overall process is energy intense.

Use of chlorine or chlorine with other reagents has been suggested by many investigators; however, application of chlorine to complex sulfides in aqueous solution has encountered severe problems. The system is not selective and solubilizes unwanted materials as well as desired values which necessitates using large amounts of chlorine to obtain high extraction. In addition, the sulfide ion is converted to sulfate. Also, in chlorine leaching as previously practiced, effective dissolution of precious metal values, such as gold and silver, is not accomplished without extensive treatment.

It has now been found, according to the process of the invention, that complex sulfide ores or concentrates may be decomposed, and metal values such as zinc, lead, copper, silver, nickel cobalt and cadmium efficiently recovered, by treatment of an aqueous slurry of the ore or concentrate with a combination of gaseous chlorine and gaseous oxygen, the amount of chlorine being limited to that necessary to convert sulfides of the desired metals to chlorides. The reactions are as follows:

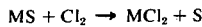

and

where M is divalent and monovalent, respectively. Sulfides are thereby converted to elemental sulfur, with minimum sulfate ion formation.

Examples of ores that may be treated according to the process of the invention are chalcopyrite, sphalerite, galena, bornite, pyrite, covellite and chalcocite. The ore is initially ground to a suitable particle size, minus 80 mesh in most cases, and slurried with water to give a pulp density of up to about 50 percent, optimum pulp density generally depending on the grade of the ore. Concentrates of the ores, prepared by conventional processing operations such as gravity of flotation concentration, may also be used. For treatment of concentrates, the pulp density may suitably be as much as about 60 percent.

After slurrying, the materials are placed in a closed reactor and chlorine gas is added at a controlled rate which causes the temperature to rise to the desired level, usually about 100° to 115° C. Temperatures from 90° to 160° C have been used, but 100° to 115° C is preferred because in this range the sulfur formed in the reaction does not melt and agglomerate. The amount of chlorine is measured and only sufficient chlorine is added to convert the metal sulfides to chlorides, excluding those of the hydrolizable metals such as iron. The reaction is generally complete in a period of about 30 minutes. Addition of the chlorine is by any conventional means such as bubbling or sparging the gas through the ore or concentrate slurry.

The oxygen, in the form of oxygen gas or air, may be added simultaneous with, or subsequent to, addition of the chlorine. It is also added at a rate sufficient to maintain the desired reaction temperature, i.e., 90° to 160° C. Partial pressure of the oxygen will usually be about 5 to 160 psig, with a range of about 30 to 60 psig being preferred. When the oxygen is added subsequent to addition of the chlorine, an oxygen partial pressure of about 30 to 60 psig is preferred.

When the optimum amount of chlorine is added without addition of oxygen, or before addition of oxygen, the sulfides in the ore or concentrate are not completely consumed, and most of the iron, antimony and arsenic present in the ore are solubilized. With the addition of the oxygen, however, where simultaneous with or subsequent to addition of chlorine, the remainder of the sulfides are consumed and the pH gradually rises to about 1.5 to 2 after a period of about 1 to 4 hours. Under these conditions, the iron, antimony and arsenic are hydroylzed to insoluble hydrous oxides and stay with the residue. Any lead present is converted to lead sulfate and lead chloride during the chlorine-oxygen treatment and also reports in the residue. Accordingly, the amount of oxygen added should be sufficient to completely consume the sulfides, and to simultaneously insolubilize iron, antimony and arsenic, as well is lead. Optimum amounts of oxygen for this purpose will vary with the type of ore or concentrate, as well the reaction conditions; however, a range of about 0.1 to 0.2 pounds of oxygen per pound of ore or concentrate generally gives satisfactory results.

It has also been found, as an additional aspect of the present invention, that still higher recoveries of metals may generally be obtained by addition of sodium, potassium or ammonium cations to the ore slurry prior to the chlorine-oxygen treatment. These cations, by formation of jarosites, prevent possible formation of jarosites of the desired metals, the latter being an undesired side reaction that may result in reduced recovery of the desired metals. The cations may be added in the form of any soluble salt, provided the anion does not interfere with the decomposition process of the invention.

Generally, chlorides are preferred, with sodium chloride usually being the most efficient and economical. The optimum amounts of the cation, or corresponding salt, may vary considerably with the particular ore or concentrate, as well as specific reaction conditions, and is best determined experimentally. In general, the amount will be that necessary to form the jarosite, as discussed above, e.g., about 20 grams of sodium chloride per 100 grams of concentrate has been found to be effective in the case of a lead-silver complex concentrate, as shown in example 9, below.

After completion of the chlorination and oxidation reactions, the resulting solution and residue are separated by conventional means such as filtration or centrifugation. Metal values and sulfur are then recovered from the solution and residue, also by conventional means. Eg, metals more electronegative than zinc, including cadmium, copper and silver, may be removed from the solution by cementing with zinc powder. Any sulfate formed may be precipitated with barium or calcium salts, e.g., the chlorides. Alternatively, calcium or barium chloride may be added to the ore slurry prior to the chlorine-oxygen treatment, whereby the major proportion of any sulfate formed reports in the residue.

When the feed material is high in zinc, e.g., a zinc concentrate, the solution will usually contain about 400 to 500 g/l zinc as zinc chloride. Zinc can be recovered from such a solution by aqueous electrowinning or fused-salt electrolysis. Lead may be recovered from the residue by leaching with 20 to 25 percent sodium chloride solution. The process thus also results in an efficient separation of lead and zinc. Most of the sulfur also reports in the residue and may be recovered by conventional methods.

Recovery of metal values from lead concentrates is similar to that for zinc concentrates, as discussed above. Concentrates containing large amounts of copper yield a solution containing copper in concentrations of about 60 to 120 g/l as copper chlorides. The copper may be removed from these solutions by a number of methods, such as liquid ion exchange or electrowinning.

The invention will be more specifically illustrated by the following examples.

EXAMPLE 1

A 50 percent slurry was made using 0.22 lb of a zinc concentrate containing 54 percent zinc, 1.5 percent lead, 0.1 percent copper, 0.33 percent cadmium, 6.9 percent iron, and 29 percent sulfur, with 3.0 oz/ton silver and a trace of gold. The slurry was treated with 0.54 lb chlorine per pound of concentrate, followed by 0.13 lb oxygen per pound. Temperature was 110° to 115° C. The extraction results were 99.4 percent zinc, 88.3 percent lead, 91.0 percent silver, 99.4 percent cadmium, 89.4 percent copper. In this experiment, 99.9 percent of the iron was retained in the residue.

EXAMPLE 2

In this example, the same zinc concentrate was used as in example 1 but an excess of chlorine (0.7 lb/lb conc.) was added. The same amount of oxygen was used as in Example 1. Extractions were as follows, in percent, zinc 99.8, lead 98.2, silver 98.3, copper 99.0, cadmium 100, but 97.2 percent of the iron remained in solution.

EXAMPLE 3

A copper concentrate containing 0.4 percent Zn, 0.1 percent Pb, 3.0 oz/ton Ag, 19.7 percent Cu, 0.38 percent Mo, 21.6 percent Fe, and 24.1 percent S was treated with 0.216 lb/lb concentrate of chlorine and 0.179 lb/lb oxygen. Extractions were 91.1 percent Cu and 81.6 percent Ag with >99.9 percent Mo and 99.95 percent Fe reporting in the residue. The residue contained 93.4 percent of the sulfur in the elemental form. The procedure was the same as example 1.

EXAMPLE 4

A lead concentrate containing 5.5 percent Zn, 68 percent Pb, 0.83 percent Cu, 40.0 oz/ton Ag, 4.9 percent Fe was treated with 0.254 lb/lb concentrated chlorine and 0.067 lb/lb concentrated oxygen using the procedure of Example 1, except that the residue was leached with 20 percent NaCl solution. Extractions were 99.8 percent Zn, 99.9 percent Pb, 98.7 percent Cu, 98.7 percent Ag, with 87.0 percent of the iron retained in the residue.

EXAMPLE 5

A zinc-copper concentrate containing 49.0 percent zinc, 8.5 percent iron, 0.3 percent cadmium, 2.03 percent copper, 1.36 percent lead, 0.0095 percent silver, and 28.5 percent sulfur was reacted with 0.5 lb $Cl_2$/lb concentrate in a slurry of 50 percent pulp density. This treatment was followed by reacting the mixture with oxygen at 40 psig and 100° to 120° C for a period of 4 hours. Extractions were 99.5 percent zinc, 99.4 percent cadmium, 96.1 percent copper, and 79.7 percent silver. Only 0.05 percent of the iron and less than 0.05 percent of the lead were retained in the filtrate.

EXAMPLE 6

Treatment of a flotation concentrate from a gabbro ore containing, in percent, 10.7 copper, 2.1 nickel, 0.11 cobalt, and 26.1 iron according to the process of the invention resulted in 93 percent recovery of copper, 97 percent recovery of nickel, and 93 percent recovery of cobalt. Over 99.9 percent of the iron remained in the residue. Chlorine consumption was 286 lb/ton of concentrate, most of which could be regenerated from electrowinning of copper. The pressure during leaching was 40 psig and the temperature was between 100° and 110° C.

EXAMPLE 7

The chlorine-oxygen leaching technique of the invention was successfully applied to a complex copper-silver-antimony concentrate. A concentrate assaying, in percent, 23.5 copper, 16.9 antimony, 1.3 lead, 3.2 silver, and 25.8 sulfur was treated with 538 lb/ton of chlorine, followed by oxygen at 40 psig and 100° to 110° C. Recoveries, in percent, were 99 copper, 99.4 silver, and 96 lead. Over 99.9 percent of the antimony was retained in the residue.

EXAMPLE 8

A complex ore containing 50.6 percent lead, 16.1 percent zinc, 0.87 percent copper, 5.35 percent iron, 0.1 percent cadmium, 35.18 oz silver per ton, and 17.0 percent sulfur was treated with 610 pounds of chlorine per ton, followed by oxygen at 40 psig and 100° to 110° C. Metal extractions, in percent, were 99.7 zinc, 99.9 lead, 97.2 copper, 99.4 silver, 0.1 iron, and 99.9 cadmium.

EXAMPLE 9

This example illustrates the higher recoveries obtained from a lead-silver complex concentrate by the addition of sodium chloride to the reactor. Comparative tests were conducted on a concentrate containing 67.6 percent lead, 93 oz/ton silver, 6.11 percent zinc, 0.80 percent copper, 1.93 percent iron, 0.65 percent antimony, 500 ppm cadmium, and 15.3 percent sulfur. The tests were conducted in the following manner: 100 grams of concentrate and either zero or 20 grams of NaCl were slurried together with 100 grams of water. Chlorine (30.5 g) was added followed by oxygen addition at 40 psig pressure at a temperature of 100° to 110° C. Results from these experiments are shown in the following table. It is evident that the recovery of lead, copper and silver were substantially improved by the addition of NaCl.

| Metal | Extraction, pct | |
|---|---|---|
| | With NaCl | Without NaCl |
| Pb | 98.9 | 95.2 |
| Zn | 99 | 99 |
| Cu | 96.2 | 86.8 |
| Ag | 97.9 | 90.6 |
| Fe | .1 | .1 |
| Sb | .1 | .1 |

We claim:

1. A process for decomposing complex sulfide ores or concentrates comprising treating an aqueous slurry of the ore or concentrate by addition of a combination of gaseous chlorine and gaseous oxygen, the chlorine being added at a rate sufficient to provide a temperature of 90° to 160°C and in an amount only sufficient to convert sulfides of metals from the group consisting of zinc, copper, silver, nickel, cobalt and cadmium to chlorides, and the oxygen being added at a rate sufficient to maintain the temperature of 90° to 160°C and in an amount sufficient to ensure complete decomposition of the ore or concentrte and provide an oxygen partial pressure of 5 to 160 psig, whereby the metals from the group consisting of zinc, copper, silver, nickel, cobalt and cadmium are solubilized, metals from the group consisting of iron, antimony and arsenic are hydrolyzed to insoluble hydrous oxides, lead is converted to insoluble lead sulfate or chloride, and sulfur in the form of sulfide is converted largely to elemental sulfur.

2. The process of claim 1 in which a sodium, potassium or ammonium salt is added to the slurry prior to addition of the chlorine and oxygen, the amount of the salt being sufficient to inhibit formation of jarosites of the desired metal values.

3. The process of claim 2 in which the salt is a chloride.

4. The process of claim 3 in which the salt is sodium chloride.

5. The process of claim 1 in which calcium or barium chloride is added to the slurry prior to addition of the chlorine and oxygen, the amount of the calcium or barium chloride being sufficient to precipitate the major proportion of any sulfate formed in the decomposition reaction.

6. The process of claim 1 in which the chlorine and oxygen are added simultaneously.

7. The process of claim 1 in which the oxygen is added subsequent to addition of the chlorine.

* * * * *